United States Patent
Yamauchi et al.

(10) Patent No.: US 6,235,845 B1
(45) Date of Patent: May 22, 2001

(54) OLEFIN (CO)POLYMER COMPOSITION

(75) Inventors: Akira Yamauchi; Jun Saito; Hiroyuki Maehara; Yuuichi Yamanaka, all of Chiba (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/462,249

(22) PCT Filed: Jul. 30, 1998

(86) PCT No.: PCT/JP98/03419

§ 371 Date: Jan. 5, 2000

§ 102(e) Date: Jan. 5, 2000

(87) PCT Pub. No.: WO99/07783

PCT Pub. Date: Feb. 18, 1999

(30) Foreign Application Priority Data

Aug. 7, 1997 (JP) ................................. 9-213108

(51) Int. Cl.$^7$ ........................... C08L 23/02; C08L 23/10
(52) U.S. Cl. ................................. 525/191; 525/240
(58) Field of Search ............................ 525/191, 240

(56) References Cited

U.S. PATENT DOCUMENTS

| | | |
|---|---|---|
| 3,808,206 | 4/1974 | Fleming et al. . |
| 4,460,757 | 7/1984 | Sato et al. . |
| 4,634,740 | 1/1987 | Fujita et al. . |
| 4,923,935 | 5/1990 | Sano et al. . |
| 5,047,485 | 9/1991 | DeNicola, Jr. . |
| 5,155,080 | 10/1992 | Elder et al. . |
| 5,252,529 | 10/1993 | Ueda et al. . |
| 5,260,384 | 11/1993 | Morimoto et al. . |
| 5,382,631 | 1/1995 | Stehling et al. . |
| 5,387,568 | 2/1995 | Ewen et al. . |
| 5,494,982 | 2/1996 | Nakacho et al. . |
| 5,519,100 | 5/1996 | Ewen et al. . |
| 5,539,067 | 7/1996 | Parodi et al. . |
| 5,561,092 | 10/1996 | Ewen et al. . |
| 5,614,457 | 3/1997 | Ewen et al. . |
| 5,629,254 | 5/1997 | Fukuoka et al. . |
| 5,663,249 | 9/1997 | Ewen et al. . |
| 5,854,354 | 12/1998 | Ueda et al. . |
| 6,004,897 | 12/1999 | Imuta et al. . |

FOREIGN PATENT DOCUMENTS

| | | |
|---|---|---|
| 32 46 447 | 7/1983 | (DE) . |
| 0 315 481 | 5/1989 | (EP) . |
| 398 350 | 11/1990 | (EP) . |
| 534 119 | 3/1993 | (EP) . |
| 536 503 | 4/1993 | (EP) . |
| 538 749 | 4/1993 | (EP) . |
| 0 577 321 A1 | 1/1994 | (EP) . |
| 579 510 | 1/1994 | (EP) . |
| 580 033 | 1/1994 | (EP) . |
| 0 611 780 A2 | 8/1994 | (EP) . |
| 714 923 | 6/1996 | (EP) . |
| 0 856 526 | 8/1998 | (EP) . |
| 0 864 589 | 9/1998 | (EP) . |
| 1 483 960 | 8/1977 | (GB) . |
| 58-138712 | 8/1973 | (JP) . |
| 52-136247 | 11/1977 | (JP) . |
| 53-91954 | 8/1978 | (JP) . |
| 55-123637 | 9/1980 | (JP) . |
| 56-3356 | 1/1981 | (JP) . |
| 56-110707 | 9/1981 | (JP) . |
| 57-31945 | 2/1982 | (JP) . |
| 57-63310 | 4/1982 | (JP) . |
| 57-65738 | 4/1982 | (JP) . |
| 57-151602 | 9/1982 | (JP) . |
| 58-17104 | 2/1983 | (JP) . |
| 58-83006 | 5/1983 | (JP) . |
| 58-225143 | 12/1983 | (JP) . |
| 59-93711 | 5/1984 | (JP) . |
| 60-81211 | 5/1985 | (JP) . |
| 60-139710 | 7/1985 | (JP) . |
| 61-064704 | 4/1986 | (JP) . |
| 61-130310 | 6/1986 | (JP) . |
| 61-151204 | 7/1986 | (JP) . |
| 61-152754 | 7/1986 | (JP) . |
| 62-1738 | 1/1987 | (JP) . |
| 62-25106 | 2/1987 | (JP) . |
| 62-104810 | 5/1987 | (JP) . |
| 62-104811 | 5/1987 | (JP) . |
| 62-104812 | 5/1987 | (JP) . |
| 63-12606 | 1/1988 | (JP) . |
| 1-156305 | 6/1989 | (JP) . |
| 2-135243 | 5/1990 | (JP) . |
| 2-298536 | 12/1990 | (JP) . |

(List continued on next page.)

OTHER PUBLICATIONS

Takaya MISE et al., "Excellent Stereoregular Isotactic Polymerizations of Propylene with $C_2$–Symmetric Silylene–Bridged Metallocene Catalysts" *Chemistry Letters*, pp. 1853–1856.

(List continued on next page.)

Primary Examiner—Nathan M. Nutter
(74) Attorney, Agent, or Firm—Merchant & Gould P.C.

(57) ABSTRACT

An olefin (co)polymer composition of the present invention comprises 99 to 70 wt. % of olefin (co)polymer (I) and 1 to 30 wt. % of polyethylene-based polymer (II). The olefin (co)polymer (I) comprises 0.01 to 5.0 parts by weight of high molecular weight polyethylene (a) having an intrinsic viscosity $\eta_A$ measured in tetralin at 135° C. of 15 to 100 dl/g, which is an ethylene homopolymer or an ethylene-olefincopolymer comprising at least 50 wt. % of ethylene polymerization units, and 100 parts by weight of olefin (co)polymer (b) other than the high molecular weight polyethylene. The polyethylene-based polymer (II) has an intrinsic viscosity $\eta_{II}$ measured in tetralin at 135° C. of 0.10 to 10 dl/g, which is an ethylene homopolymer or an ethylene copolymer comprising at least 50 wt. % of ethylene polymerization units. Thus, the present invention provides a polypropylene-based olefin (co)polymer composition having excellent formability that is suitable for thermoforming such as vacuum forming and pressure forming, blow molding and foam molding, especially suitable for thermoforming.

10 Claims, No Drawings

FOREIGN PATENT DOCUMENTS

| | | |
|---|---|---|
| 2-305811 | 12/1990 | (JP) . |
| 3-12406 | 1/1991 | (JP) . |
| 3-12407 | 1/1991 | (JP) . |
| 3-50239 | 3/1991 | (JP) . |
| 3-220208 | 9/1991 | (JP) . |
| 4-55410 | 2/1992 | (JP) . |
| 5-65373 | 3/1993 | (JP) . |
| 5-140224 | 6/1993 | (JP) . |
| 5-222122 | 8/1993 | (JP) . |
| 5-255436 | 10/1993 | (JP) . |
| 5-255437 | 10/1993 | (JP) . |
| 6-184371 | 7/1994 | (JP) . |
| 6-206923 | 7/1994 | (JP) . |
| 6-206939 | 7/1994 | (JP) . |
| 6-234812 | 8/1994 | (JP) . |
| 7-188317 | 7/1995 | (JP) . |
| 7-188336 | 7/1995 | (JP) . |
| 7-238114 | 9/1995 | (JP) . |
| 8-217816 | 8/1996 | (JP) . |
| 8-217889 | 8/1996 | (JP) . |
| 10-17736 | 1/1998 | (JP) . |
| WO 88/05792 | 8/1988 | (WO) . |
| WO 88/05793 | 8/1988 | (WO) . |
| WO 94/28034 | 12/1994 | (WO) . |

OTHER PUBLICATIONS

Walter Spaleck et al., "The Influence of Aromatic Substituents on the Polymerization Behavior of Bridged Zirconocene Catalysts" *Organometallics*, vol. 13, No. 3 (American Chemical Society), pp. 954–963.

A. Zambelli, et al., Model Compounds and C NMR Observation of Stereosequences of Polypropylene, pp. 687–689, Macromolecules vol. 8, No. 5.

A. Zambelli, et al., Carbon–13 Observations of the Stereochemical Configuration of Polypropylene, pp. 925–926, Macromolecules vol. 6, No. 6.

Kaminsky, *Metallocene Catalysts*, Dec. 7–8–9, 1992.

OLEFIN (CO)POLYMER COMPOSITION

This application claims priority under 35 USC 371 of prior PCT International Application PCT/JP98/03419, filed Jul. 30, 1998.

TECHNICAL FIELD

The present invention relates to an olefin (co)polymer composition. More specifically, the present invention relates to an olefin (co)polymer composition having excellent formability that is suitable for thermoforming such as vacuum forming and pressure forming, blow molding and foam molding, especially for thermoforming.

BACKGROUND ART

Polypropylene is widely used in a variety of molding fields because of its superior mechanical properties, chemical resistance and cost-effectiveness. However, its melt strength is low, so that it is of inferior formability in thermoforming such as vacuum forming and pressure forming, blow molding and foam molding.

Some methods have been proposed to enhance the melt strength of polypropylene. For example, Japanese Laid-Open Patent Publication (Tokkai-Sho) Nos. 59-93711 and 61-152754 have disclosed a method of reacting polypropylene with an organic peroxide and a crosslinking assistant in a molten state. Japanese Laid-Open Patent Publication (Tokkai-Hei) No.2-298536 has disclosed a method of reacting semicrystalline polypropylene with a peroxide having a low degradation temperature in the absence of oxygen so as to produce polypropylene having free-end long branches and containing no gel.

Other methods for enhancing melting viscoelastic properties such as melt strength are, for example, a method of using a composition comprising polyethylenes or polypropylenes having different intrinsic viscosities or molecular weights, or a method of producing such compositions by multistage polymerization.

For example, Japanese Patent Publication (Tokko-Sho) No. 61-28694 has disclosed a method where 2 to 30 parts by weight of ultra high molecular weight polypropylene are added to 100 parts by weight of regular polypropylene and extrusion is performed in a temperature range from a melting point to 210° C. Japanese Patent Publication (Tokko-Hei) No. 1-12770 has disclosed a method using multistage polymerization to obtain an extrusion sheet formed of two components of polypropylene having different molecular weights and an intrinsic viscosity ratio of at least 2. Japanese Patent Publication (Tokko-Sho) No. 62-61057 has disclosed a method of producing a polyethylene composition formed of three types of polyethylene having different viscosity average molecular weights comprising 1 to 10 wt % of high viscosity average molecular weight polyethylene by melting and kneading or multistage polymerization. Japanese Patent Publication (Tokko-Hei) No. 5-79683 has disclosed a method for polymerizing polyethylene in which an amount between 0.05 and 1 wt % of ultra high molecular weight polyethylene having an intrinsic viscosity of 20 dl/g or more is polymerized by multistage polymerization. Japanese Patent Publication (Tokko-Hei) No.7-8890 has disclosed a method for polymerizing polyethylene in which 0.1 to 5 wt % of ultra high molecular weight polyethylene having an intrinsic viscosity of 15 dl/g or more is polymerized by multistage polymerization in a polymerization reactor having a special arrangement by using a highly active titanium catalyst component prepolymerized with 1-butene or 4-methyl-1-pentene.

Furthermore, Japanese Laid-Open Patent Publication (Tokkai-Hei) No. 5-222122 has disclosed a method for producing polypropylene having a high melt strength by polymerizing propylene by using a prepolymerized catalyst that results from the prepolymerization of ethylene and a polyene compound with a support type solid catalyst component comprising titanium and an organic aluminum compound catalyst component. Japanese Laid-Open Patent Publication (Tokkai-Hei) No. 4-55410 has disclosed a method for producing ethylene α-olefin copolymer having high melt strength by using an ethylene-containing preliminary polymerization catalyst comprising a polyethylene with an intrinsic viscosity of at least 20 dl/g, wherein preliminary polymerization is performed exclusively in the ethylene by using the same catalyst as above.

An olefin (co)polymer having a good thermoformability for a sheet has been developed. For example, Japanese Patent Publication (Tokko-Sho) No. 56-15744 has disclosed a method of adding low density polyethylene and hydrated magnesium silicate powder to polypropylene. Japanese Patent Publication (Tokko-Sho) No. 63-29704 has disclosed a method of adding high density polyethylene and ethylene-propylene copolymer to polypropylene.

Although it has to be acknowledged that in the various components proposed in the prior art as described above and in the production processes belonging thereto the melt strength of polyolefin has been somewhat increased, many aspects such as a residual odor caused by the crosslinking assistant and forming-processability have io be improved.

Moreover, in a multistep polymerization that incorporates a production process of high molecular weight polyolefin into a main polymerization of a regular polypropylene (co)polymerization process, the precise control of the amount of olefin for (co)polymerization for formation of a small amount of high molecular weight polyolefin is difficult, and a low polymerization temperature is necessary for formation of the polyolefin with a sufficiently large molecular weight, which lowers the rate of production for the polypropylene composition. Thus, improvement of the process is necessary.

In the method for prepolymerizing a polyene compound, it is necessary to prepare the polyene compound separately. When propylene is polymerized according to a disclosed method of prepolymerizing polyethylene, the dispersibility of the prepolymerized polyethylene in a finally obtained polypropylene composition is not uniform, so that from the viewpoint of stability of the polypropylene composition, improvement of the process is required.

As has been pointed out above, the problem of low melt strength of polypropylene, as well as the problems of odor and low forming-processability are inherent in the prior art.

DISCLOSURE OF INVENTION

It is an object of the present invention to provide a polypropylene-based olefin (co)polymer composition having excellent formability that is suitable for thermoforming such as vacuum forming and pressure forming, blow molding and foam molding, especially suitable for thermoforming.

As a result of ardent research to achieve the object, the Inventors discovered that a polypropylene-based olefin (co) polymer composition having excellent forming-processability can be obtained by blending a polyethylene-based polymer composition with a composition obtained by (co)polymerizing propylene with a preactivated catalyst in which a small amount of polypropylene for the main (co)

polymerization and polyethylene having a specific intrinsic viscosity are supported by a polyolefin-producing catalyst.

An olefin (co)polymer composition of the present invention comprises 99 to 70 wt % of olefin (co)polymer [I] and 1 to 30 wt % of polyethylene-based polymer [II]. The olefin (co)polymer [I] comprises 0.01 to 5.0 parts by weight of high molecular weight polyethylene (a) having an intrinsic viscosity $\eta_A$ measured in tetralin at 135° C. of 15 to 100 dl/g, which is an ethylene homopolymer or an ethylene-olefin copolymer comprising at least 50 wt % of ethylene polymerization units, and 100 parts by weight of an olefin (co)polymer (b) other than the high molecular weight polyethylene. The polyethylene-based polymer [II] has an intrinsic viscosity $\eta_{II}$ measured in tetralin at 135° C. of 0.10 to 10 dl/g, and is an ethylene homopolymer or an ethylene copolymer comprising at least 50 wt % of ethylene polymerization units.

In the olefin (co)polymer composition of the present invention, it is preferable that the olefin (co)polymer [I] have an intrinsic viscosity $\eta_I$ measured in tetralin at 135° C. of 0.2 to 10 dl/g.

In the olefin (co)polymer composition of the present invention, it is preferable that the olefin (co)polymer other than the high molecular weight polyethylene be at least one selected from the group consisting of a propylene homopolymer and a propylene-olefin copolymer comprising at least 50 wt % of propylene polymerization units.

In the olefin (co)polymer composition of the present invention, it is preferable that the olefin (co)polymer [I] have a melt strength (MS) at 230° C. and an intrinsic viscosity $\eta_I$ measured in tetralin at 135° C. that satisfy the relationship represented by the following equation:

log(MS)>4.24×log[$\eta_I$]−0.95.

In the olefin (co)polymer composition of the present invention, it is preferable that the olefin (co)polymer [I] be produced by (co)polymerizing propylene alone or propylene and another olefin having 2 to 12 carbon atoms in the presence of a preactivated catalyst comprising a polyolefin producing catalyst and polyethylene supported by the polyolefin producing catalyst. The polyolefin producing catalyst preferably comprises a transition metal compound catalyst component, 0.01 to 1,000 mols of an organic metal compound (AL1) of a metal selected from the group consisting of metals belonging to Groups I, II, XII and XIII of the periodic table (1991 version described in the fourth edition of Chemical Guide, Basics I edited by the Chemical Society of Japan published by Maruzen) per mol of transition metal atoms, and 0 to 500 mols of electron donor (E1) per mol of transition metal atoms.

In the olefin (co)polymer composition of the present invention, it is preferable that the olefin (co)polymer [I] be produced by (co)polymerizing propylene alone or propylene and another olefin having 2 to 12 carbon atoms in the presence of an olefin (co)polymerization catalyst comprising the preactivated catalyst and further comprising an organic metal compound (AL2) of a metal selected from the group consisting of metals belonging to Groups I, II, XII and XIII of the periodic table (1991 version), and an electron donor (E2). The olefin main (co)polymerization catalyst preferably comprises 0.05 to 5,000 mols (per mol of transition metal atoms) of a total of the organic metal compound (AL2) and the organic metal compound (AL1) in the preactivated catalyst, and 0 to 3,000 mols (per mol of transition metal atoms in the preactivated catalyst) of a total of the electron donor (E2) and the electron donor (E1) in the preactivated catalyst.

In the olefin (co)polymer composition of the present invention, it is preferable that the preactivated catalyst support 0.01 to 5,000 g of polyethylene having an intrinsic viscosity $\eta_A$ measured in tetralin at 135° C. of 15 to 100 dl/g per g of the transition metal compound catalyst component.

In the olefin (co)polymer composition of the present invention, it is preferable that the preactivated catalyst support 0.01 to 100 g of polypropylene, having an intrinsic viscosity $\eta_B$ measured in tetralin at 135° C. of less than 15 dl/g (hereinafter referred to as polypropylene (B)), per g of the transition metal compound catalyst component and 0.01 to 5,000 g of polyethylene, having an intrinsic viscosity $\eta_A$ measured in tetralin at 135° C. of 15 to 100 dl/g (hereinafter referred to as polyethylene (A)), per g of the transition metal compound catalyst component.

In the olefin (co)polymer composition of the present invention, it is preferable that the olefin (co)polymer [I] be produced in a catalyst amount of 0.01 to 1,000 mmols on the basis of transition metal atoms in the catalyst per liter of (co)polymerization volume of propylene or propylene and another olefin.

The olefin (co)polymer composition of the present invention is preferably used for thermoforming such as vacuum forming and pressure forming or foam molding.

BEST MODE FOR CARRYING OUT THE INVENTION

The term "polypropylene" used in the specification of the present application means a propylene homopolymer, a propylene-olefin random copolymer and a propylene-olefin block copolymer comprising at least 50 wt % of propylene polymerization units, which is referred to as "polypropylene composition" hereinafter. The term "polyethylene" means an ethylene homopolymer and an ethylene-olefin random copolymer comprising at least 50 wt % of ethylene polymerization units, which is referred to as "polyethylene composition" hereinafter.

The polyethylene constituting the component (a) of the polypropylene composition [I] has an intrinsic viscosity $\eta_A$ of 15 to 100 dl/g when measured at 135° C. in tetralin. It is an ethylene homopolymer or an ethylene-olefin copolymer comprising at least, 50 wt % of ethylene polymerization units. Preferably, it is an ethylene homopolymer or an ethylene-olefin copolymer comprising at least 70 wt % of ethylene polymerization units, more preferably an ethylene homopolymer or an ethylene-olefin copolymer comprising at least 90 wt % of ethylene polymerization units. These (co)polymers can be used alone or in combinations of two or more.

When the component (a) has an intrinsic viscosity $\eta_A$ of less than 15 dl/g, the melt strength of the resulting polypropylene composition is lowered, resulting in insufficient improvement in formability. The intrinsic viscosity $\eta_A$ has no particular upper limit, but when the difference with respect to the intrinsic viscosity $\eta_P$ of the polypropylene of component (b) becomes too large, the dispersibility of the polyethylene of component (a) in the polypropylene of component (b) declines when producing a composition thereof, so that the melt strength cannot be raised, resulting in insufficient improvement in formability. Also from the viewpoint of production efficiency, an upper limit of about 100 dl/g is preferable.

The polyethylene of component (a) has an intrinsic viscosity $\eta_A$ of 15 to 100 dl/g, preferably 17 to 50 dl/g. Since it is necessary to raise the molecular weight of the polyethylene of component (a) to attain an intrinsic viscosity $\eta_A$ of 15 dl/g measured in 135° C. tetralin, the ethylene polymerization units are preferably 50 wt % or more from the viewpoint of raising the molecular weight efficiently.

The olefin other than ethylene that is copolymerized with ethylene constituting the polyethylene of component (a) is not particularly limited, but an olefin having 3 to 12 carbon atoms is used preferably. Specific examples thereof include propylene, 1-butene, 1-pentene, 1-hexene, 1-octene, 1-decene, 4-methyl-1-pentene and 3-methyl-1-pentene. These olefins can be used alone or in combinations of two or more.

There are no specific limitations regarding the density of the polyethylene of component (a). However, to be specific, a density of 880 g/l to 980 g/l is preferable.

The polypropylene of component (b) of the polypropylene composition [I] is a crystalline polypropylene with an intrinsic viscosity $\eta_P$ of 0.2 to 10 dl/g when measured at 135° C. in tetralin. It is a propylene homopolymer, a propylene-olefin random copolymer containing at least 50 wt % of propylene polymerization units, or a propylene-olefin block copolymer containing at least 50 wt % of propylene polymerization units, preferably a propylene homopolymer, a propylene-olefin random copolymer containing at least 90 wt % of propylene polymerization units, or a propylene-olefin block copolymer containing at least 70 wt % of propylene polymerization units. These (co)polymers can be used alone or in combinations of two or more.

For the polypropylene of component (b), a polypropylene with an intrinsic viscosity $\eta_P$ of 0.2 to 10 dl/g, preferably 0.5 to 8 dl/g, is used. When the intrinsic viscosity $\eta_P$ of the polypropylene of component (b) is less than 0.2 dl/g, the mechanical properties of the resulting polypropylene composition degrade. When 10 dl/g is surpassed, the formability of the resulting polypropylene composition degrades.

There are no specific limitations concerning the olefin (other than propylene) copolymerized with propylene to constitute the polypropylene of component (b). However, an olefin with 2 to 12 carbons is used preferably. To be specific, ethylene, 1-butene, 1-pentene, 1-hexene, 1-octene, 1-decene, 4-methyl-1-pentene, and 3-methyl-1-pentene can be given as examples, and not only the use of one olefin, but the use of two or more is also possible.

Regarding the stereoregularity of the polypropylene of component (b), there are no specific restrictions, and any crystalline polypropylene that can achieve the purpose of the present invention can be used. To be specific, the isotactic pentad fraction (mmmm) measured with $^{13}$C-NMR (Nuclear Magnetic Resonance) spectroscopy is preferably 0.80 to 0.99, more preferably 0.85 to 0.99 and most preferably 0.90 to 0.99.

The isotactic pentad fraction (mmmm) has been proposed by A. Zambelli et al (Macromolecules 6, 925 (1973)) and is measured by $^{13}$C-NMR. It is the isotactic fraction of the pentad units in the polypropylene molecule chains and has been determined here by the assignment determination technique for peaks in the spectroscopic measurement as proposed by A. Zambelli et al (Macromolecules 8, 687 (1975)). To be specific, the measurement was performed at 67.20 MHz, 130° C., using a compound solution of o-dichlorobenzene/benzene bromide with a weight ratio of 8:2 and a polymer concentration of 20 wt %. As measuring equipment, e.g. a JEOL-GX270 NMR measuring device (a product of NIHON DENSHI Co.) can be used.

It is preferable that the melt strength (MS) at 230° C. of the polypropylene composition [I] and its intrinsic viscosity $\eta_I$ measured at 135° C. in tetralin satisfy the relationship represented by the equation:

$$\log(MS) > 4.24 \times \log[\eta_I] - 0.95.$$

There is no specific upper limit concerning the melt strength. However, when the melt strength is excessively high, the formability of the composition deteriorates. Therefore, a preferable range thereof is $$4.24 \times \log[\eta_I] + 0.60 > \log(MS) > 4.24 \times \log[\eta_I] - 0.95,$$

more preferably $$4.24 \times \log[\eta_I] + 0.34 > \log(MS) > 4.24 \times \log[\eta_I] - 0.95,$$

and most preferably $$4.24 \times \log[\eta_I] + 0.34 > \log(MS) > 4.24 \times \log[\eta_I] - 0.83.$$

Here, the melt strength (MS) at 230° C. refers to the tension (in cN) of a thready polypropylene composition measured under the following conditions: olefin (co) polymer composition is heated to 230° C. in MELT TENSION TESTER II (a product of TOYO SEIKI SEISAKU-SHO, Ltd.), the melting polypropylene composition is extruded into 23° C. air through a nozzle having a diameter of 2.095 mm at a rate of 20 mm/min to form a strand, and finally the tension of this thread-shaped polypropylene composition is measured when taking up the obtained strand at a rate of 3.14 m/min.

Throughout this specification, the term "preactivation" refers to an activation for adding molecular weight to a polyolefin-producing catalyst prior to the main (co) polymerization of propylene or propylene and another olefin. The preactivation is performed by preactivation (co)polymerization of ethylene or ethylene and another olefin in the presence of a polyolefin-preparing catalyst to let the catalyst support the polyolefin.

The preactivated catalyst used for olefin (co) polymerization of the present invention is a catalyst that is preactivated to let a polyolefin-producing catalyst support a small amount of polyolefin for the main (co)polymerization having a specific intrinsic viscosity and a small amount of polyolefin having a specifically high intrinsic viscosity. The polyolefin-producing catalyst comprises a transition metal compound catalyst component conventionally used for production of polyolefin, an organic metal compound and, if desired, an electron donor.

In the preactivated catalyst used for olefin (co) polymerization of the present invention, the transition metal compound catalyst component can be any known polyolefin-producing catalyst component containing a transition metal compound catalyst component as a main component. Above all, a titanium-containing solid catalyst component is preferably used from the viewpoint of industrial production.

The titanium-containing solid catalyst component can be a titanium-containing solid catalyst component containing a titanium trichloride composition as the main component (see e.g. Japanese Patent Publication (Tokko-Sho) Nos. 56-3356, 59-28573, and 63-66323), or a titanium-containing support type catalyst component including titanium, magnesium, a halogen and an electron donor as essential components, where a magnesium compound supports titanium tetrachloride (see e.g. Japanese Laid-Open Patent Publication (Tokkai-Sho) Nos. 62-104810, 62-104811, 62-104812, 57-63310, 57-63311, 58-83006, and 58-138712). Any of those described above can be used.

Another example of the transition metal compound catalyst component is a transition metal compound having at least one π electron conjugated ligand, which is generally called a metallocene. The transition metal included in the transition metal compound is preferably selected from the group consisting of Zr, Ti, Hf, V, Nb, Ta and Cr.

Specific examples of the uc electron conjugated ligand include a ligand having a T) η-cyclopentadienyl structure, a η-benzene structure, a η-cycloheptatrienyl structure, or a η-cyclooctatetraene structure, and a most preferable example is a ligand having a η-cyclopentadienyl structure.

Examples of the ligand having a η-cyclopentadienyl structure include a cyclopentadienyl group, an indenyl group and a fluorenyl group. These groups may be substituted with a hydrocarbon group such as an alkvl group, an aryl group and an aralkyl group, a silicon-substituted hydrocarbon group such as a trialkylsilyl group, a halogen atom, an alkoxy group, an aryloxy group, a chain alkylene group, a cyclic alkyle.,e group or the like.

Furthermore, in the case where the transition metal compound comprises two or more π electron conjugated ligands, two π electron conjugated ligands can be crosslinked through an alkylene group, a substituted alkylene group, a cycloalkylene group, a substituted cycloalkylene group, a substituted alkylidene group, a phenyl group, a silvlene group, a dimethylsilylene group, a germyl group (Me$_2$Ge) or the like. In this case, the transition metal compound catalyst component may comprise a hydrocarbon group such as an alkyl group, a cycloalkyl group, an aryl group, an aralkyl group, a silicon-substituted hydrocarbon group, an alkoxy group, an aryloxy group, a substituted sulfonato group, an amidesilylene group and an amidealkylene group, in addition to at least one π electron conjugated ligand as described above. A bivalent group such as an amidesilylene group and an amidealkylene group may be coupled to the π electron conjugated ligand.

The transition metal compound catalyst component having at least one π electron conjugated ligand generally called a metallocene mav be supported by a fine particle support. As the fine particle support, an inorganic or organic compound in the form of a granular or spherical fine particle solid having a particle diameter of 5 to 300 μm, preferably 10 to 200 μm, can be used. Examples of the inorganic compound used as the support include SiO$_2$, Al$_2$O$_3$, MgO, TiO$_2$ and ZnO, or the mixture thereof. Among these, a compound that comprises SiO$_2$, or Al$_2$O$_3$ as the main component is used preferably. Examples of the organic compound used as the support include an α-olefin polymer or copolymer having 2 to 12 carbon atoms such as ethylene, propylene, 1-butene, and 4-methyl-1-pentene, and a polymer or a copolymer of styrene or styrene derivatives.

The organic metal compound (AL1) can be a compound having an organic group of a metal selected from the group consisting of Group I metals, Group II metals, Group XII metals and Group XIII metals in terms of the periodic table issued in 1991. Examples of the compound having an organic group of a metal include organic lithium compounds, organic sodium compounds, organic magnesium compounds, organic zinc compounds and organic aluminum compounds. Such an organic metal compound can be used in combination with the above-mentioned transition metal compound catalyst component.

From among these examples, it is preferable to use organic aluminum compounds represented by the general formula AlR$^1_p$R$^2_q$X$_{3-(p+q)}$, wherein R$^1$ and R$^2$ each represent a hydrocarbon group such as an alkyl group, a cycloalkyl group or an aryl group, or an alkoxy group, R$^1$ and R$^2$ can be identical or different, X represents a halogen atom, and p and q are positive numbers satisfying the formula: $0<p+q\leq3$.

Specific examples of the organic aluminum compound include trialkyl aluminum such as trimethyl aluminum, triethyl aluminum, tri-n-propyl aluminum, tri-n-butyl aluminum, tri-i-butyl aluminum, tri-n-hexyl aluminum, tri-i-hexyl aluminum and tri-n-octyl aluminum, dialkyl aluminum monohalides such as diethyl aluminum chloride, di-n-propyl aluminum chloride, di-i-butyl aluminum chloride, diethyl aluminum bromide and diethyl aluminum iodide, dialkyl aluminum hydrides such as diethyl aluminum hydride, alkyl aluminum sesquihalides such as ethyl aluminum sesquichloride, monoalkyl aluminum dihalide such as ethyl aluminum dichloride, and alkoxyalkyl aluminum such as diethoxymonoethyl aluminum. Trialkyl aluminum or dialkyl aluminum monohalide is used preferably. These organic aluminum compounds can be used alone or in combinations of two or more.

Furthermore, an aluminoxane compound can be used as the organic metal compound (AL1). Aluminoxane refers to an organic aluminum compound represented by general formulae 1 or 2.

(general formula 1)

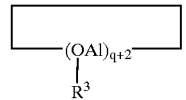

(general formula 2)

where R$^3$ is a hydrocarbon group having 1 to 6 carbon atoms, preferably 1 to 4 carbon atoms, more specifically, an alkyl group such as a methyl group, an ethyl group, a propyl group, a butyl group, an isobutyvl group, a pentyl group and a hexyl group, an alkenyl group such as an allyl group, a 2-methylallyl group, a propenyl group, an isopropenyl group, a 2-methyl-1-propenyl group and a butenyl group, a cycloalkyl group such as a cyclopropyl group, a cyclobutyl group, a cyclopentyl group and a cyclohexyl group, and an aryl group. Among these, an alkyl group is most preferable, and R$^3$ may be either the same or different. Furthermore, q is an integer of 4 to 30, preferably 6 to 30, and most preferably 8 to 30.

Furthermore, another example of the organic metal compound (AL1) is a boron-based organic metal compound. A boron-based organic metal compound can be obtained by reacting a transition metal compound with an ionic compound comprising a boron atom. Examples of the transition metal compound used with an ionic compound are the same as those of the transition metal compound catalyst component used for preparing the preactivated catalyst for olefin (co)polymerization. Among these, a transition metal compound catalyst component having at least one π electron conjugated ligand called a metallocene as described above is preferable.

Specific examples of the ionic compound having a boron atom include tetrakis (pentafluorophenyl) triethylammonium borate, tetrakis (pentafluorophenyl) tri-n-butylammonium borate, tetrakis (pentafluorophenyl) triphenylammonium borate, tetrakis (pentafluorophenyl) methylammonium borate, tetrakis (pentafluorophenyl) tri-dimethylammonium borate, and tetrakis (pentafluorophenyl) trimethylammonium borate.

Furthermore, the boron-based organic metal compound can be obtained by contacting a transition metal compound with a Lewis acid containing a boron atom. Examples of the transition metal compound used herein are the same as those of the transition metal compound catalyst component used for preparing the preactivated catalyst for olefin (copolymerization. Among these, a transition metal compound catalyst component having at least one π electron conjugated ligand generally called a metallocene as described above is preferable.

For the Lewis acid containing a boron atom, the compounds represented by general formula 3 below can be used.

$$BR^4R^5R^6 \quad \text{(general formula 3)}$$

where $R^4$, $R^5$, and $R^6$ each represents a fluorine atom, an alkyl group such as a methyl group, a halogenated alkyl group, a phenyl groak, or a trifluorophenyl group or the like, independently.

Specific examples of the compound represented by general formula 3 include tri(n-butyl) boron, triphenyl boron, tris[3,5-bis(trifluoromethynphenyl]boron, tris(4-fluoromethyl phenyl) boron, tris(3,5-difluorophenyl) boron, tris(2,4,6-trifluorophenyl) boron, and tris (pentafluorophenyl) boron. Among these, tris (pentafluorophenyl) boron is most preferable.

The electron donor (E1) is used for the purpose of regulating the generation speed and/or the stereoregularity of polyolefin, if necessary.

Examples of the electron donor (E1) include an organic compound having any of oxygen, nitrogen, sulfur and phosphorus in the molecules of ethers, alcohols, esters, aldehydes, fatty acids, ketones, nitrites, amines, amides, ureas and thioureas, isocyanates, azo compounds, phosphines, phosphites, phosphinates, hydrogen sulfides, thioethers, neoalcohols, silanols, and an organic silicon compound having an Si—O—C bond in the molecules.

Examples of ethers include dimethyl ether, diethyl ether, di-n-propyl ether, di-n-butyl ether, di-i-amyl ether, di-n-pentyl ether, di-n-hexyl ether, di-i-hexyl ether, di-n-octyl ether, di-i-octyl ether, di-n-dodecyl ether, diphenyl ether, ethylene glycol monoethyl ether, diethylene glycol dimethyl ether, and tetrahydrofuran. Examples of alcohols include methanol, ethanol, propanol, butanol, pentanol, hexanol, octanol, 2-ethyl hexanol, allyl alcohol, benzyl alcohol, ethylene glycol, and glycerin. Examples of phenols include phenol, cresol, xylenol, ethryl phenol, and naphthol.

Examples of esters include monocarboxylic acid esters such as methyl methacrylate, methyl formate, methyl acetate, methyl butyrate, ethyl acetate, vinyl acetate, propyl-n-acetate, propyl-i-acetate, butyl formate, amyl acetate, butyl-n-acetate, octyl acetate, phenyl acetate, ethyl propionate, methyl benzoate, ethyl benzoate, propyl benzoate, butyl benzoate, octyl benzoate, 2-ethylhexyl benzoate, toluic acid methyl ester, toluic acid ethyl ester, anisic acid methyl ester, anisic acid ethyl ester, anisic acid propyl ester, anisic acid phenyl ester, ethyl cinnamate, naphthoic acid methyl ester, naphthoic acid ethyl ester, naphthoic acid propyl ester, naphthoic acid butyl ester, 2-ethylhexyl naphthoic acid, and ethyl phenylacetate, aliphatic polycarboxylic acid ester such as diethyl succinate, methylmalonic acid diethyl ester, butylmalonic acid diethyl ester, dibutyl maleate, and diethyl butylmaleic acid, and aromatic polycarboxylic acid ester such as monometyl phthalate, dimetyl phthalate, dietyl phthalate, di-n-propyl phthalate, mono-n-butyl phthalate, di-n-butyl phthalate, diisobutyl phthalate, di-n-heptyl phthalate, di-2-ethylhexyl phthalate, di-n-octyl phthalate, diethyl isophthalate, dipropyl isophthalate, dibutyl isophthalate, 2-ethylhexyl diisophthalate, diethyl terephthalate, dipropyl terephthalate, dibutyl terephthalate, and naphthalenedicarboxylic acid diisobutyl ester.

Examples of aldehyde include acetaldehyde, propionaldehyde, and benzaldehyde. Examples of carboxylic acids include monocarboxylic acid such as formic acid, acetic acid, propionic acid, butvric acid, oxalic acid, succinic acid, acrylic acid, maleic acid, valeric acid and benzoic acid, and acid anhydride such as benzoic anhydride, phthalic anhydride and tetrahydrophthalic anhydride. Examples of ketone include acetone, methylethyl ketone, methylisobutyl ketone, and benzophenone.

Examples of nitrogen-containing compounds include nitriles such as acetonitrile and benzonitrile, amines such as methyl amine, diethyl amine, tributyl amine, triethanolamine, β(N,N-dimethylamino)ethanol, pyridine, quinoline, α-picoline, 2,4,6-trimethyl pyridine, 2,2,5,6-tetramethyl piperidine, 2,2,5,5-tetramethyl pyrrolidine, N,N, N',N'-tetramethyl ethylenediamine, aniline and dimethyl aniline, amides such as formamide, hexamethyl phosphoric acid triamide, N,N,N',N',N"-pentamethyl-N'-β-dimethylaminomethyl phosphoric acid triamide and octamethyl pyrophosphoramide, urea such as N,N,N',N',-tetramethyl urea, isocyanates such as phenyl isocyanate and toluyl isocyanate, and an azo compound such as azobenzene.

Examples of phosphorus containing compounds include phosphines such as ethyl phosphine, triethyl phosphine, tri-n-octyl phosphine, triphenyl phosphine, dimethyl phosphine, di-n-octyl phosphine, triphenyl phosphine, and triphenyl phosphine oxide; and phosphites such as dimethyl phosphite, di-n-octyl phosphite, triethyl phosphite, tri-n-butyl phosphite and triphenyl phosphite.

Examples of sulfur-containing compounds include thioethers such as diethyl thioether, diphenyl thioether or methyl phenyl thioether; and thioalcohols such as ethyl thioalcohol, n-propyl thioalcohol or thiophenol. Examples of organic silicon compounds include silanols such as trimethyl silanol, triethyl silanol or triphenyl silanol; and organic silicon compounds having an Si—O—C bond, such as trimethyl methoxysilane, dimethyl dimethoxysilane, methylphenyl dimethoxysilane, diphenyl dimethoxysilane, methyltrimethoxysilane, vinyltrimethoxysilane, phenyltrimethoxysilane, trimethyl ethoxysilane, dimethyl diethoxysilane, diisopropyl dimethoxysilane, diisobutyl dimethoxysilane, diphenyl diethoxysilane, methyl triethoxysilane, ethyl triethoxysilane, vinyl triethoxysilane, butyl triethoxysilane, phenyl triethoxysilane, ethyl triisopropoxysilane, vinyl triacetoxysilane, cyclopentyl methyl dimethoxysilane, cyclopentyl trimethoxysilane, dicyclopentyl dimethoxysilane, cyclohexyl methyl dimethoxysilane, cyclohexyl trimethoxysilane, dicyclohexyl dimethoxysilane and 2-norbornyl methyl diethoxysilane.

These electron donors can be used either alone or in combinations of two or more.

The preactivated catalyst comprises the transition metal compound catalyst component and the following components:

a polyolefin producing catalyst comprising 0.01 to 1,000 mols of the organic metal compounds (AL1) of a metal selected from the group consisting of metals belonging to Group I (e.g. Li and Na), Group II (e.g. Mg), Group XII (e.g. Zn), and Group XIII (e.g. Al) of the periodic table (1991 version) per mol of the transition metal atom, and 0 to 500 mols of the electron donor (E1) per mol of the transition metal atom;

0.01 to 100 g of the polypropylene (B) for the main (co)polymerization, having an intrinsic viscosity η<sub>B</sub> measured in tetralin at 135° C. of less than 15 dl/g, per gram of the transition metal compound catalyst component; and 0.01 to 5,000 g of the polyethylene (A), having an intrinsic viscosity $\eta_A$ measured in tetralin at 135° C. of 15 to 100 dl/g, per gram of the transition metal compound catalyst component, which are supported by the polyolefin producing catalyst.

In the preactivated catalyst, the polyethylene (A) has an intrinsic viscosity $\eta_A$ in the range of 15 to 100 dl/g, preferably 17 to 50 dl/g, measured in tetralin at 135° C. The polyethylene (A) is an ethylene homopolymer or a copolymer of ethylene and an olefin having 3 to 12 carbon atoms comprising at least 50 wt % of ethylene polymerization units, preferably at least 70 wt % of ethylene polymerization units, more preferably at least 90 wt % of ethylene polymerization units.

The support amount of the polyethylene (A) per gram of the transition metal compound catalyst component is 0.01 to 5,000 g, preferably 0.05 to 2,000 g, more preferably 0.1 to 1,000 g. When the support amount is less than 0.01 g per gram of the transition metal compound catalyst component, the melt strength of the polypropylene composition [I] obtained eventually from the main (co)polymerization cannot be raised sufficiently, resulting in insufficient formability. On the other hand, more than 5,000 g of the polyethylene (A) per gram of the catalyst component is not effective and can deteriorate the homogeneity of the finally obtained polypropylene composition [I]. Thus, these amounts are not preferable.

The polypropylene (B) has an intrinsic viscosity $\eta_B$ of less than 15 dl/g, measured in tetralin at 135° C. It has the same constitution as the polypropylene component (b) for the main (co)polymerization, which is eventually incorporated into the polypropylene component (b) of the polypropylene composition [I].

The support amount of the polypropylene (B) per gram of the transition metal compound catalyst component is 0.01 to 100 g. In other words, the amount is preferably 0.001 to 1 wt % on the basis of the finally obtained polypropylene composition [I].

According to the present invention, a preactivated catalyst is prepared by a preactivation treatment as follows: Polypropylene (B) is formed by preliminary (co)polymerization of propylene or propylene and another olefin for the main (co)polymerization. This preliminary (co)polymerization is performed in the presence of a polyolefin producing catalyst formed by the combination of a transition metal compound catalyst component, an organic metal compound (AL1) and, if desired, an electron donor (E1). Then, the polyethylene (A) is formed by preactivation (co)polymerization of ethylene or ethylene and another olefin. The polyethylene (A) and the polypropylene (B) are supported by the transition metal compound catalyst component.

In this preactivation treatment, the polyolefin producing catalyst comprises the transition metal compound catalyst component, 0.01 to 1000 mols, preferably 0.05 to 500 mols, (per mol of transition metal in the catalyst component) of the organic metal compound (AL1), and 0 to 500 mols, preferably 0 to 100 mols, (per mol of transition metal in the catalyst component) of the electron donor (E1).

The following method lets the transition metal compound catalyst component support the polypropylene (B) and the polyethylene (A): First, 0.01 to 100 g of polypropylene (B) per gram of a transition metal compound catalyst component is formed by preliminary (co)polymerization using 0.01 to 500 g of propylene for the main (co)polymerization or a combination of propylene and another olefin in the presence of 0.001 to 5,000 mmols, preferably 0.01 to 1000 mmols, of the polyolefin-producing catalyst on the basis of transition metal atoms in the catalyst component per liter of (co)polymerization volume of ethylene ($Z_1$) or a mixture ($Z_2$) of ethylene and another olefin that are described later. In this process, no solvent or at most 100 liter solvent per gram of the transition metal compound catalyst component is used. Then, 0.01 to 5,000 g polyethylene (A) per gram of a transition metal compound catalyst component are formed by preactivation (co)polymerization using 0.01 to 10,000 g of ethylene ($Z_1$) or a mixture ($Z_2$) of ethylene and another olefin. Thus, the polypropylene (B) and the polyethylene (A) are supported by the transition metal compound catalyst component.

Throughout this specification, the term "polymerization volume" refers to a volume of the liquid phase in a polymerization container for liquid phase polymerization or a volume of the gas phase in a polymerization container for gas phase polymerization.

The amount of the transition metal compound catalyst component used is preferably in the above indicated range, so as to maintain an efficient and controlled (co)polymerization reaction rate of the propylene. When too little of the organic metal compound (AL1) is used, the (co)polymerization reaction rate is reduced, and when too much is used, no corresponding improvement of the (co)polymerization reaction rate can be expected, and the residual amount of organic metal compound (AL1) which remains in the finally obtained polypropylene composition [I] becomes too large. When too much of the electron donor (E1) is used, the (co)polymerization reaction rate is reduced. When too much solvent is used, a big reaction container becomes necessary, and it becomes difficult to control and maintain an efficient (co)polymerization reaction rate.

The preactivation treatment can be performed in a liquid phase inert solvent, e.g. an aliphatic hydrocarbon such as butane, pentane, hexane, heptane, octane, isooctane, decane or dodecane, an alicyclic hydrocarbon such as cyclopentane, cyclohexane or methylcyclohexane, an aromatic hydrocarbon such as toluene, xylene or ethylbenzene, in inert solvents such as gasoline fraction or hydrogenized diesel oil fraction, in a liquid phase using the olefin itself as a solvent, or in a gas phase without using a solvent.

The preactivation treatment can be performed in the presence of hydrogen. However, it is preferable not to use hydrogen to form a high molecular weight polyethylene (A) with an intrinsic viscosity $\eta_A$ of 15 to 100 dl/g.

In the preactivation treatment, the conditions for the preliminary (co)polymerization of propylene or a mixture of propylene and another olefin for the main (co)polymerization are such that 0.01 g to 100 g of the polypropylene (B) is formed per gram of the transition metal compound catalyst component. Generally, a temperature of −40° C. to 100° C., a pressure of 0.1 to 5 MPa and a time frame of 1 min to 24 h are suitable. Furthermore, the conditions for the preactivation (co)polymerization of ethylene or a mixture of ethylene and another olefin are not particularly limited, as long as 0.01 g to 5,000 g, preferably 0.05 to 2,000 g, more preferably 0.1 to 1,000 g, of polyethylene (A) is formed per gram of the transition metal compound catalyst component. Generally, a relatively low temperature of the order of −40° C. to 40° C., more preferably −40° C. to 30° C. and most preferably −40° C. to 20° C., a pressure of 0.1 to 5 MPa, more preferably 0.2 to 5 MPa, most preferably 0.3 to 5 MPa, and a time frame of 1 min to 24 h, more preferably 5 min to 18 h. most preferably 10 min to 12 h, are suitable.

After the preactivation treatment, in order to control a reduction of the main (co)polymerization activity due to the preactivation treatment, addition polymerization of propylene or a mixture of propylene and another olefin for the main (co)polymerization can be performed with a reaction amount of 0.01 to 100 g polypropylene (B) per gram of the transition metal compound catalyst component. In this case, the amounts of the organic metal compound (AL1), the electron donor (E1), the solvent and the propylene or the mixture of propylene with another olefin used can be in the same range as in the preactivation polymerization with ethylene or a mixture of ethylene with another olefin. However, it is preferable to perform the addition polymerization in the presence of 0.005 to 10 mols, preferably 0.01 to 5 mols, of the electron donor per mol of transition metal atoms. Concerning the reaction conditions, a temperature of −40 to 100° C. and a pressure of 0.1 to 5 MPa and a time frame of 1 min to 24 h are suitable.

For the organic metal compound (AL1), electron donor (E1) and solvents used in the addition polymerization, substances as for the preactivation polymerization with ethylene or a mixture of ethylene and another olefin can be used, and for the propylene or the mixture of propylene with another olefin, a composition as for the main (co)polymerization can be used.

The preactivated catalyst can be used as an olefin main (co)polymerization catalyst for the main (co)polymerization of olefin with carbon number 2 to 12 to obtain the polypropylene composition [I], and can be used in an unaltered form or further comprising an additional organic metal compound (AL2) and electron donor (E2).

The olefin main (co)polymerization catalyst comprises 0.05 to 3,000 mols, preferably 0.1 to 1.000 mols, (per mol of transition metal atoms in the preactivated catalyst) of a total (AL1+AL2) of the organic metal compound (AL2) and the organic metal compound (AL1) in the preactivated catalyst, and 0 to 5,000 mols, preferably 0 to 3,000 mols, (per mol of transition metal atoms in the preactivated catalyst) of a total (E1+E2) of the electron donor (E2) and the electron donor (E1) in the preactivated catalyst.

When the content of the organic metal compound (AL1+AL2) is too small, the (co)polymerization reaction rate in the main (co)polymerization reaction of propylene or propylene and another olefin is too slow. On the other hand, an amount which is excessively large is ineffective, since the (co)polymerization reaction rate does not improve as much as might be expected, and the residual amount of organic metal compounds remaining in the finally-obtained polypropylene composition becomes too large. Furthermore, an excessive amount of electron donors (E1+E2) leads to a considerable deterioration of the (co)polymerization reaction rate.

Similar substances to the already mentioned organic metal compound (AL1) and the electron donor (E1) can be used for the organic metal compound (AL2) and the electron donor (E2) to be added, if necessary, to the olefin main (co)polymerization catalyst. Furthermore, it is possible not only to add one substance, but the combined use of two or more substances is also possible. Furthermore, the same substances or different substances as used for the preactivation treatment can be used.

The olefin main (co)polymerization catalyst can be (i) granules or a suspension of these granules with solvent, obtained by filter-separation or decantation of the solvent, the not-yet-reacted olefins, the organic metal compound (AL1) and the electron donor (E1) present in the preactivated catalyst, combined with the additional organic metal compound (AL2) and the facultative electron donor (E2), or (ii) granules or a suspension of these granules with solvent, obtained by distillation under reduced pressure or evaporation by inert gas flow or the like of the solvent and the not-yet-reacted olefins present in the preactivated catalyst, combined with the organic metal compound (AL2) and the electron donor (E2), if desired.

In this method for producing the polypropylene composition [I], the amount of the preactivated catalyst or olefin main (co)polymerization catalyst for use is 0.001 to 1000 mmols preferably 0.005 to 500 mmols per liter of polymerization volume in terms of transition metal atoms in the preactivated catalyst. By employing the above-defined range for the transition metal compound catalyst component, an efficient and controlled (co)polymerization reaction rate of propylene or a mixture of propylene and another olefin can be maintained.

The main (co)polymerization of propylene or a mixture of propylene and another olefin in the production of the polypropylene composition [I] can be performed by a known polymerization process, such as slurry polymerization, bulk polymerization with the olefin itself as a solvent, gas phase polymerization with polymerization of the olefin in a gas phase, liquid polymerization in which polyolefin is generated by polymerization in the form of a liquid phase, or a combination of at least two thereof. With slurry polymerization, olefin is polymerized in solvents such as an aliphatic hydrocarbon including propane, butane, pentane, hexane, heptane, octane, isooctane, decane or dodecane; alicyclic hydrocarbons such as cyclopentane, cyclohexane or methylcyclohexane; aromatic hydrocarbons such as toluene, xylene or ethylbenzene; or inert solvents such as gasoline fraction or hydrogenized diesel oil fraction.

In any of the above processes, the polymerization temperature is in a range of 20 to 120° C., preferably 30 to 100 ° C., more preferably 40 to 100° C., the polymerization pressure is in a range of 0.1 to 5 MPa, preferably 0.3 to 5 MPa, and the polymerization time between is 5 min to 24 hours of continuous, semi-continuous or batch polymerization. Under these conditions, the polypropylene component (b) can be formed efficiently with a controlled reaction rate.

In a more preferred embodiment of the method for producing a polypropylene composition [I] of the present invention, the polymerization conditions are selected so that the intrinsic viscosity $\eta_I$ of the polypropylene composition of component (b) generated in the main (co)polymerization is in the range from 0.2 to 10 dl/g, preferably 0.7 to 5 dl/g, and that the obtained polypropylene composition [I] contains 0.01 to 5 wt % of the polyethylene (A) derived from the used preactivated catalyst.

Subsequent to the main (co)polymerization, well-known processes such as a catalyst deactivation process, a catalyst residue removal process and a drying process are performed if necessary, so as to obtain the polypropylene composition [I].

Examples of polyethylene-based polymer of component [II] include high density polyethylene, medium density polyethylene, low density polyethylene, linear low density polyethylene, super low density polyethylene, ethylene-propylene copolymer, ethylene-butene copolymer, and ethylene-vinyl acetate copolymer. These polymers can be used in combinations of two or more.

The polyethylene-based polymer of component [II] is included in an amount of 1 to 30 wt %, preferably 3 to 25 wt %, which provides a significant improvement in formability.

The intrinsic viscosity $\eta_{II}$ measured in tetralin at 135° C. of the polyethylene-based polymer of component [II] is 0.10 to 10 dl/g, preferably 0.10 to 5 dl/g, which provides a significant improvement in formability.

Any production method can be used for producing the olefin (co)polymer composition of the present invention, as long as the melt strength of the polypropylene composition [I] is in the above-mentioned range. The olefin (co)polymer composition of the present invention can be produced easily by compounding the polypropylene composition [I] and the polyethylene copolymer [II]. The polypropylene composition [I] is obtained by (co)polymerizing propylene or propylene and another olefin in the presence of the catalyst preactivated with ethylene or ethylene and another olefin as specifically described above.

EXAMPLES

Hereinafter, the present invention will be more specifically described by way of examples and comparative examples.

The definition of terms and measurement methods used in the Examples and Comparative Examples are as follows.

Intrinsic viscosity η: a value (unit: dug) as a result of measurement by an Ostwald's viscometer (manufactured by Mitsui Toatsu Chemicals, Inc.) of an intrinsic viscosity measured in tetralin at 135° C.

Formability: A sample sheet with a thickness of 0.4 mm is prepared. The sample sheet is secured to a frame with a 300×300 mm opening, and the secured sample sheet is held horizontally in a heating furnace with a constant temperature of 200° C. for a predetermined period of time. In the evaluation of the sheet formed of polypropylene or a composition thereof, the following phenomena generally occur. First, the central portion of the sheet hangs down from the frame as a result of heating. Then, the portion of the sheet hanging down returns to some extent. The portion of the sheet stays in this state for a certain period of time. Finally, the portion of the sheet hangs down again, and never returns. An amount of the first hanging-down is referred to as "hanging-amount" (mm). A rate of the amount of the return to the hanging amount is referred to as "return-rate" (%). A period of time during which the sheet stays at the position where the sheet returns is referred to as "staying-time" (see). A sheet having a smaller hanging-amount, a larger return-rate and a longer staying-time is recognized as having better formability.

Example 1
(I) Preparation of Transition Metal Compound Catalyst Component

In a stainless steel reactor with an agitator having an inner volume of 100 liters, 37.5 liters of decane, 7.14 kg of magnesium chloride anhydride and 35.1 liters of 2-ethyl-1-hexanol were mixed and heated to 140° C. for 4 hours while being stirred for thermal reaction. Thus, a homogeneous solution was prepared. Then, 1.67 kg of phthalic anhydride was added to the homogeneous solution, and stirred at 130° C. for one hour for mixture so that phthalic anhydride was dissolyed in the homogeneous solution.

The resultant homogeneous solution was cooled to room temperature (23° C.), and then dripped in its full amount into 200 liters of titanium tetrachloride with a constant temperature of –20° C. over 3 hours in a stainless steel reactor with an agitator having an inner volume of 500 liters. After dripping, the solution was warmed to 110° C. over 4 hours. When the temperature reached 110° C., 5.03 liter of diisobutyl phthalate was added and the mixture was stirred at 110° C. for two hours for reaction. After the 2 hour reaction was complete, thermal filtration was performed so as to collect a solid portion. Then, the solid portion was resuspended in 275 liters of titanium tetrachloride in a stainless steel reactor with an agitator having an inner volume of 500 liters, and then the reaction was effected at 110° C. for 2 hours again.

After the reaction was completed, the solid portion was again collected by thermal filtration, and washed with n-hexane until free titanium was no longer detected in the washing solution. Then, the solyent was separated by filtration and the solid portion was dried under reduced pressure so as to obtain a titanium-containing support type catalyst component (a transition metal compound catalyst component) containing 2.4 wt % of titanium.

(2) Preparation of Preactivated Catalyst

After nitrogen gas has been filled into a stainless steel reactor provided with an inclined turbine agitator having an inner volume of 30 liters, 18 liters of n-hexane, 60 mmols of triethyl aluminum (the organic metal compound (AL1)) and 150 g (75.16 mmols on the basis of the titanium atoms) of the titanium-containing support type catalyst component prepared above were added, and 500 g of propylene was supplied, and thus prepolymerization was effected at –2° C. for 40 min.

When the polymer formed in another prepolymerization performed under the same conditions was analyzed, it was found that polypropylene (B) was generated in an amount of 3.0 g per gram of the titanium-containing support type catalyst component, and the intrinsic viscosity $\eta_B$ of the polypropylene (B) measured in tetralin at 135° C. was 2.8 dl/g.

After the reaction time passed, unreacted propylene was discharged out of the reactor, the gas phase in the reactor was replaced with a nitrogen gas once, and then ethylene was supplied to the reactor continuously for 5 hours so that the pressure in the reactor was maintained at 0.59 MPa while the temperature in the reactor was maintained at –1° C. Thus, preactivation polymerization was performed.

When the polymer formed in another preactivation polymerization performed under the same conditions was analyzed, it was found that 63.8 g of polymers per gram of the titanium-containing support type catalyst component were present, and the intrinsic viscosity $\eta_T$ of the polymers measured in tetralin at 135° C. was 30.8 dl/g.

The amount ($W_A$) of the polyethylene (A) per gram of the titanium-containing support type catalyst component formed by the preactivation polymerization with ethylene can be obtained by the following equation as a difference between the amount ($W_T$) of the polymer formed per gram of the titanium-containing support type catalyst component after the preactivation treatment and the amount ($W_B$) of the polypropylene (B) per gram of the titanium-containing support type catalyst component after the prepolymerization.

$$W_A = W_T - W_B$$

The intrinsic viscosity $\eta_A$ of the polyethylene (A) formed by the preactivation polymerization with ethylene can be obtained from the intrinsic viscosity $\eta_B$ of the polypropylene (B) formed by the prepolymerization and the intrinsic viscosity $\eta_T$ of the polymer formed by the preactivation treatment by the following equation.

$$\eta_A = (\eta_T \times W_T - \eta_B \times W_B)/(W_T - W_B)$$

According to the above equation, the amount of the polyethylene (A) formed by the preactivation polymerization with ethylene was 60.8 g per gram of the titanium-containing support type catalyst component, and the intrinsic viscosity $\eta_A$ thereof was 32.2 dl/g.

After the reaction time passed, unreacted ethylene was discharged out of the reactor, the gas phase in the reactor was replaced with nitrogen gas once, and thus a preactivated catalyst slurry for the main (co)polymerization was prepared.

(3) Production of Polypropylene Composition (Main (co) polymerization of Propylene)

After nitrogen gas has been filled into a continuous horizontal gas phase polymerization container (length/diameter=3.7) having a stirring device attached to it and a volume of 110 liters, 25 kg of polypropylene powder having an MFR of 9.8 g/10 min that acts as a dispersant for the preactivated catalyst was introduced into the container. Furthermore, 0.65 g/h of the preactivated catalyst slurry as the titanium-containing support type catalyst component and 15 wt % n-hexane solution of triethyl aluminum (organic metal compound (AL2)) and di-isopropyldimethoxysilane (electron donor (E2)) were continuously supplied so that the molar ratios became 90 and 15, based on the titanium atoms in the titanium-containing support type catalyst component, respectively.

Under a polymerization temperature of 70° C., hydrogen was supplied so as to attain a hydrogen/propylene ratio of 0.002 in the polymerization container. Propylene was supplied so as to maintain a pressure of 2.15 MPa inside the polymerization container to perform gas phase polymerization of the propylene continuously for 150 hours.

During the polymerization period, polymer was taken out from the polymerization container at a rate of 11 kg/h so as to maintain the polymer level in the polymerization container at 60 vol %.

The received polymer was subjected to contact treatment with a nitrogen gas containing 5 vol % of water vapor at 100° C. for 30 minutes to obtain a polypropylene composition [I] having an intrinsic viscosity $\eta_I$ of 2.75 dl/g.

The ratio of polyethylene (A) gene rated by the preactivation treatment in the polymer was 0.36 wt % and the intrinsic viscosity $\eta_P$ of polypropylene was 2.64 dl/g.

The melt strength (MS) of the obtained polypropylene composition [I] was 9.8 cN.

This polypropylene composition [I] and a low density polyethylene [II] with an intrinsic viscosity $\eta_{II}$ of 1.45 dl/g and a density of 0.918 g/cm$^3$ were mixed in the ratio shown in Table 1. Furthermore, 0.1 parts by weight of 2,6-di-t-butyl-p-cresol and 0.01 parts by weight of calcium stearate were mixed therewith, and pellets were produced from the mixture by an extruder with a screw diameter of 40 mm and a cylinder temperature of 230° C.

A sheet with a thickness of 0.4 mm was formed of this composition at a resin temperature of 230° C., a cooling roll temperature of 60° C. and a taking-up rate of 10 m/min, using a T-die sheet-forming machine with a screw diameter of 65 mm. The formability of the obtained sheet is shown in Table 1.

Examples 2–4

Pellets and a sheet were formed under the same conditions as in Example 1, except that the mixture ratios of the polypropylene composition [I] and the low density polyethylene [II] were changed as shown in Table 1. The results of the formability tests for the sheets are shown in Table 1.

Example 5

Pellets and a sheet were formed under the same conditions as in Example 1, except that a low density polyethylene [II] having an intrinsic viscosity $\eta_{II}$ of 1.09 dl/g and a density of 0.918 g/cm$^3$ was mixed with the polypropylene composition [I] obtained in Example 1 in the ratio shown in Table 1. The results of the formability test for the sheet are shown in Table 1.

Example 6

Pellets and a sheet were formed under the same conditions as in Example 1, except that a low density polyethylene [II] having an intrinsic viscosity $\eta_{II}$ of 0.25 dl/g and a density of 0.920 g/cm$^3$ was mixed with the polypropylene composition [I] obtained in Example 1 in the ratio shown in Table 1. The results of the formability test for the sheet are shown in Table 1.

TABLE 1

| | | Example | | | | | |
|---|---|---|---|---|---|---|---|
| | | 1 | 2 | 3 | 4 | 5 | 6 |
| Mixture Ratio | PP[I]-1 preactivated with ethylene | 97 | 95 | 90 | 80 | 90 | 90 |
| | PP[I]-2 not preactivated with ethylene | — | — | — | — | — | — |
| | PE[II]-1 LDPE[1]: $\eta$ = 1.45 dl/g | 3 | 5 | 10 | 20 | — | — |
| | PE[II]-2 LDPE[1]: $\eta$ = 1.09 dl/g | — | — | — | — | 10 | — |
| | PE[II]-3 LDPE[1]: $\eta$ = 0.25 dl/g | — | — | — | — | — | 10 |
| | PE[II]-4 EPR[2]: $\eta$ = 1.93 dl/g | — | — | — | — | — | — |
| Formability | Hanging amount (mm) | 21 | 20 | 18 | 14 | 18 | 17 |
| | Return rate (%) | 76 | 84 | 86 | 98 | 83 | 80 |
| | Staying time (sec.) | 186 | 214 | 244 | 350 | 235 | 222 |

Note:
[1]LDPE: low density polyethylene
[2]EPR: ethylene-propylene copolymer

Example 7

Pellets and a sheet were formed under the same conditions as in Example 1, except that an ethylene-propylene copolymer (77 wt % of ethylene and 23 wt % of propylene) [II] having an intrinsic viscosity $\eta_{II}$ of 1.93 dl/g and a density of 0.87 g/cm$^3$ was mixed with the polypropylene compoosition [I] obtained in Example 1 in the ratio shown in Table 2. The results of the formability test for the sheet are shown in Table 2.

Example 8–11

Pellets and a sheet were formed under the same conditions as in Example 1, except that the low density polyethylene [II] used in Example 1 and the ethylene-propylene copolymer [II] used in Example 7 were mixed with the polypropylene composition [I] obtained in Example 1 in the ratio shown in Table 2. The results of the formability tests for the sheets are shown in Table 2.

TABLE 2

| | | Example | | | | |
|---|---|---|---|---|---|---|
| | | 7 | 8 | 9 | 10 | 11 |
| Mixture Ratio | PP[I]-1 preactivated with ethylene | 95 | 92 | 90 | 85 | 75 |
| | PP[I]-2 not preactivated with ethylene | — | — | — | — | — |
| | PE[II]-1 LDPE[1]: $\eta$ = 1.45 dl/g | — | 3 | 5 | 10 | 20 |
| | PE[II]-2 LDPE[1]: $\eta$ = 1.09 dl/g | — | — | — | — | — |
| | PE[II]-3 LDPE[1]: $\eta$ = 0.25 dl/g | — | — | — | — | — |
| | PE[II]-4 EPR[2]: $\eta$ = 1.93 dl/g | 5 | 5 | 5 | 5 | 5 |
| Forma-bility | Hanging amount (mm) | 19 | 18 | 18 | 18 | 12 |
| | Return rate (%) | 74 | 78 | 80 | 86 | 98 |
| | Staying time (sec.) | 152 | 228 | 300 | 326 | 364 |

Note:
[1]LDPE: low density polyethylene
[2]EPR: ethylene-propylene copolymer

TABLE 3

| | | Comparative Example | | | | |
|---|---|---|---|---|---|---|
| | | 1 | 2 | 3 | 4 | 5 |
| Mixture Ratio | PP[I]-1 preactivated with ethylene | 100 | — | — | — | — |
| | PP[I]-2 not preactivated with ethylene | — | 100 | 90 | 95 | 85 |
| | PE[II]-1 LDPE[1]: $\eta$ = 1.45 dl/g | — | — | 10 | — | 10 |
| | PE[II]-2 LDPE[1]: $\eta$ = 1.09 dl/g | — | — | — | — | — |
| | PE[II]-3 LDPE[1]: $\eta$ = 0.25 dl/g | — | — | — | — | — |
| | PE[II]-4 EPR[2]: $\eta$ = 1.93 dl/g | — | — | — | 5 | 5 |
| Forma-bility | Hanging amount (mm) | 22 | 22 | 19 | 19 | 17 |
| | Return rate (%) | 72 | 66 | 70 | 69 | 70 |
| | Staying time (sec.) | 132 | 40 | 50 | 43 | 54 |

Note:
[1]LDPE: low density polyethylene
[2]EPR: ethylene-propylene copolymer

Comparative Example 1

Pellets and a sheet were formed under the same conditions as in Example 1, except that the ethylene-based copolymer was not mixed with the polypropylene composition [I] obtained in Example 1. The results of the formability test for the sheet are shown in Table 3.

Comparative Example 2

Polypropylene was produced under the same conditions as in Example 1, except that the preactivation polymerization of titanium-containing support type catalyst component with ethylene was not performed. The intrinsic viscosity $\eta_I$ of the obtained polypropylene composition [I] was 2.70 dl/g, and the melt strength (MS) was 4.8 cN. Pellets and a sheet were formed of this polypropylene composition [I] under the same conditions as in Comparative Example 1. The results of the formability test for the sheet are shown in Table 3.

Comparative Example 3

The polypropylene composition [I] obtained in Comparative Example 2 was mixed with the same polyethylene-based copolymer [II] as in Example 1 in the ratio shown in Table 3, so as to form pellets and a sheet under the same conditions as in Example 1. The results of the formability test for the sheet are shown in Table 3.

Comparative Example 4

The polypropylene composition [I] obtained in Comparative Example 2 was mixed with the same polyethylene-based copolymer [II] as in Example 7 in the ratio shown in Table 3, so as to form pellets and a sheet under the same conditions as in Example 1. The results of the formability test for the sheet are shown in Table 3.

Comparative Example 5

The polypropylene composition [I] obtained in Comparative Example 2 was mixed with the same polyethylene-based copolymers [II] as used in Examples 1 and 7 in the ratio shown in Table 3, so as to form pellets and a sheet under the same conditions as in Example 1. The results of the formability test for the sheet are shown in Table 3.

Industrial Availability

As described above, according to the present invention, a catalyst is preactivated to let a polyolefin producing catalyst support a small amount of polypropylene for the main (co)polymerization and polyethylene having a specific intrinsic viscosity. A composition obtained by (co)polymerizing propylene with the preactivated catalyst is mixed with a polyethylene-based polymer composition. Thus, the present invention can provide a polypropylene-based olefin (co)polymer composition excellent in formability and suitable for thermoforming such as vacuum forming or pressure forming, blow molding and foam molding, more suitable for thermoforming and foam molding, especially suitable for thermoforming.

What is claimed is:

1. An olefin (co)polymer composition comprising 99 to 70 wt % of olefin (co)polymer [I] and 1 to 30 wt % of polyethylene-based polymer [II],
    the olefin (co)polymer [I] comprising:
        0.01 to 5.0 parts by weight of high molecular weight polyethylene (a) having an intrinsic viscosity $\eta_A$ measured in tetralin at 135° C. of 15 to 100 dl/g, which is an ethylene homopolymer or an ethylene-olefin copolymer comprising at least 50 wt % of ethylene polymerization units; and
        100 parts by weight of olefin (co)polymer (b) other than the high molecular weight polyethylene,
    the polyethylene-based polymer [II] having an intrinsic viscosity $\eta_{II}$ measured in tetralin at 135° C. of 0.10 to 10 dl/g, which is an ethylene homopolymer or an ethylene copolymer comprising at least 50 wt % of ethylene polymerization units.

2. The olefin (co)polymer composition according to claim 1, wherein the olefin (co)polymer [I] has an intrinsic viscosity $\eta_I$ measured in tetralin at 135° C. of 0.2 to 10 dl/g.

3. The olefin (co)polymer composition according to claim 1, wherein the olefin (co)polymer other than the high molecular weight polyethylene is at least one selected from the group consisting of a propylene homopolymer and a propylene-olefin copolymer comprising at least 50 wt % of propylene polymerization units.

4. The olefin (co)polymer composition according to claim 1, wherein the olefin (co)polymer [I] has a melt strength (MS) at 230° C. and an intrinsic viscosity $\eta_I$ measured in tetralin at 135° C. that satisfy a relationship represented by the following equation:

$$\log(MS) > 4.24 \times \log[\eta_I] - 0.95.$$

5. The olefin (co)polymer composition according to claim 1, wherein the olefin (co)polymer [I] is produced by (co)polymerizing propylene alone or propylene and another olefin having 2 to 12 carbon atoms in the presence of a preactivated catalyst comprising a polyolefin producing catalyst and polyethylene supported by the polyolefin producing catalyst, the polyolefin producing catalyst comprising a transition metal compound catalyst component, 0.01 to 1,000 mols of an organic metal compound (AL1) of a metal selected from the group consisting of metals belonging to Groups I, II, XII and XIII of the periodic table (1991 version) per mol of transition metal atoms, and 0 to 500 mols of electron donor (E1) per mol of transition metal atoms.

6. The olefin (co)polymer composition according to claim 5, wherein the olefin (co)polymer [I] is produced by (co)polymerizing propylene alone or propylene and another olefin having 2 to 12 carbon atoms in the presence of an olefin main (co)polymerization catalyst comprising the preactivated catalyst and further comprising: an organic metal compound (AL2) of a metal selected from the group consisting of metals belonging to Groups I, II, XII and XIII of the periodic table (1991 version); and an electron donor (E2), the olefin main (co)polymerization catalyst comprising:
0.05 to 5,000 mols (per mol of transition metal atoms) of a total of the organic metal compound (AL2) and the organic metal compound (AL1) in the preactivated catalyst; and
0 to 3,000 mols (per mol of transition metal atoms in the preactivatedl catalyst) of a total of the electron donor (E2) and the electron donor (E1) in the preactivated catalyst.

7. The olefin (co)polymer composition according to claim 5, wherein the preactivated catalyst supports 0.01 to 5,000 g of polyethylene, having an intrinsic viscosity $\eta_A$ measured in tetralin at 135° C. of 15 to 100 dl/g, per g of the transition metal compound catalyst component.

8. The olefin (co)polymer composition according to claim 5, wherein the preactivated catalyst supports 0.01 to 100 g of polypropylene, having an intrinsic viscosity $\eta_B$ measured in tetralin at 135° C. of less than 15 dl/g, per g of the transition metal compound catalyst component and 0.01 to 5,000 g of polyethylene, having an intrinsic viscosity $\eta_A$ measured in tetralin at 135° C. of 15 to 100 dl/g, per g of the transition metal compound catalyst component.

9. The olefin (co)polymer composition according to claim 5, wherein the olefin (co)polymer [I] is produced in a catalyst amount of 0.01 to 1,000 mmols on the basis of transition metal atoms in the catalyst per liter of (co)polymerization volume of propylene or propylene and another olefin.

10. The olefin (co)polymer composition according to claim 1, which is at least one selected from the group consisting of an olefin (co)polymer composition for thermoforming and an olefin(co)polymer composition for foam molding.

* * * * *